United States Patent [19]
Mechanic

[11] Patent Number: 5,721,661
[45] Date of Patent: Feb. 24, 1998

[54] POWER FILTER

[75] Inventor: Bahram Mechanic, Houston, Tex.

[73] Assignee: IEPS Electronic, Inc., Houston, Tex.

[21] Appl. No.: 631,832

[22] Filed: Apr. 10, 1996

[51] Int. Cl.$^6$ .......................................... H02H 9/00

[52] U.S. Cl. .................. 361/118; 361/56; 361/127; 361/111

[58] Field of Search .............................. 361/56, 91, 118, 361/119, 127, 58, 42, 111

[56] References Cited

U.S. PATENT DOCUMENTS 4,912,589  3/1990  Stolarczyk ........................ 361/56

*Primary Examiner*—Jeffrey A. Gaffin
*Assistant Examiner*—Stephen Jackson
*Attorney, Agent, or Firm*—Bush, Riddle & Jackson

[57] ABSTRACT

An improved power filter circuit is disclosed. The improvement concern providing a clamping device between a ground lead and a terminal of a safety circuit such that when the power filter has its hot and neutral leads properly connected to hot and neutral leads of a utility circuit, a switch of the safety circuit connects the clamping device to be between ground and neutral leads of the power filter circuit, but when the hot and neutral leads of a utility circuit are reversed, the switch of the safety circuit connects the safety circuit directly between the neutral and hot leads of the power filter circuit, thereby creating an indicator, such as a red light, that the hot and neutral leads are reversed, yet the clamping device is now not connected between the neutral and ground leads of the power filter circuit. Accordingly, the clamping device connected between the ground and neutral leads may be rated during normal operations at a lower value, e.g., 20 volts, to protect against possible surges of a lower voltage level between the ground and neutral leads. Further, a capacitor is connected between the ground and neutral leads during normal operations of the power filter circuit. The value of the capacitor is large so as to provide substantially unlimited filtration between neutral and ground during normal connection of the power filter circuit to a power utility outlet. Such filtration protects computers and computerized equipment against malfunction.

4 Claims, 2 Drawing Sheets

POWER FILTER

BACKGROUND OF THE INVENTION

1. Field of the Invention

This invention relates to a power filter circuit which is arranged and designed to be placed in the power circuit path between hot, neutral and ground leads of utility lines and equipment such as copiers, computers, fax machines, and the like. Such power filter circuit is arranged and designed to protect such equipment from voltage surges and reversed polarity utility wiring.

2. Description of the Prior Art

Power filters have been previously known for protecting equipment from reversal of wiring of the hot and neutral leads of a utility plug. Such utility plug also includes a ground lead in modern electrical wiring systems. A known power filter includes a relay circuit which controls a single pole, single throw switch which, when the hot and neutral leads of the utility plug are properly connected, opens a safety circuit provided between the hot and the neutral leads of the power circuit. When the hot and neutral leads of the utility plug are improperly reversed, the power filter closes a safety circuit from the hot and neutral leads so that a visual indicator lights in order to alert a user that the hot and neutral leads of the utility plug are reversed. For such known power filter, clamping devices are provided across the hot and neutral leads of the power filter circuit, across the hot and ground leads, and across the neutral and ground leads.

With the clamping devices connected as described above in the known power filter, each such clamping device is required to be rated at a value slightly above the expected A.C. voltage amplitude between hot and neutral. The clamping device between the neutral and ground leads is rated in such known filter at 130 volts, for example, a few volts higher than line voltage of 120 volts, for example. Since such clamping device is connected in the known power filter between the neutral and ground leads, such clamping device must have a high rating, because the circuit is designed for operation where the neutral and hot leads of the filter circuit may carry reversed voltages where it is connected to a live plug where the hot and neutral leads are reversed in error. In other words, there may be a 120 volts applied between the neutral and ground leads of the power filter, and if a clamping device is placed across such leads, it must have a high rating, such as 120 volts, in order to protect against surges or spikes in line voltage.

A problem with such known prior power filter is that because of its arrangement, the clamping device between its neutral and ground leads must be rated at a high value, e.g. 130 volts. A more desirable value, for example 20 volts, would prevent power surges above the neutral and ground leads which exceed a lower voltage level.

Another problem with such known power filter concerns the small size of a capacitor in parallel with the damping device. Such small size of capacitor in micro farads has in the past limited the filtering action of the circuit between neutral and ground.

3. Identification of Objects of the Invention

A principal object of the invention is to provide an improved power filter of the known power filter type described above, but with an arrangement such that a clamping device may be provided having a lower clamping voltage characteristic, thereby to better protect against voltage surges or spikes between the neutral and ground leads during normal operation of the power filter.

Another object of the invention is to provide an improved power filter of the known power filter type described above but with a capacitor between neutral and ground during normal operations which is larger than that provided with the known power filter in order to obtain enhanced filtering of noise that might occur between neutral and ground.

SUMMARY

The objects described above, as well as other advantages and features of the invention are embodied in an improved power filter where the improvement concerns a different connection of a clamping device from a ground lead to a neutral lead. In the known circuit arrangement of a power filter, a clamping device is connected directly across neutral and ground leads of the circuit. When the known power filter is connected to proper hot and neutral leads of utility wiring a relay controlled switch of the circuit has its relay switch arm in an "open" position with the base of the switch connected to the neutral lead. If the known power filter were to be connected to an electric utility wall plug that has its hot and neutral leads reversed, the relay circuit causes the relay switch arm to move to a "closed" position, thereby causing a visual indicator to function in order to warn a user that the utility leads are reversed. In such a situation with the known power filter, the clamping device connected between the power filter neutral lead and ground must be designed for clamping a high voltage value, e.g., 130 volts, to account for the fact that 120 volts will ordinarily, in that situation, be across the neutral and ground leads of the power filter circuit.

The improvement to the known circuit of this invention changes the connection of the clamping device from ground to the neutral lead so that it is connected between ground and the indicator circuit "open position" to a point where the relay arm in its normally open position is connected. Thus, during normal operations the clamping device may be rated at a lower value so as to prevent surges, greater than a lower value, for example 20 volts. When the improved power filter of the invention is actually connected to reversed utility leads, the relay switch arm moves to a "closed position" thereby causing one or more light emitting diodes to light, thereby indicating to the user that the power filter is connected to reversed hot and neutral leads. In that circumstance, with the base of the relay switch arm connected to the power filter neutral lead (which because of the reversal of the utility leads is at a high voltage), the clamping device which provides voltage spike or surge protection from ground to neutral is not in the circuit. Other surge protection devices one from the power filter ground lead to the power filter hot lead, and a second connected across the power filter hot lead to the power filter neutral lead provide surge protection during the time when the power filter is connected to reversed leads.

Another improvement to the known circuit of this invention changes the size of the capacitor which is connected between neutral and ground during normal operations. The size of such capacitor is increased to provide unlimited filtration of noise between neutral and ground.

BRIEF DESCRIPTION OF THE DRAWINGS

The objects, advantages and features of the invention will become more apparent by reference to the drawings which are appended hereto and wherein an illustrative embodiment of the invention is shown, of which.

DESCRIPTION OF THE INVENTION

Figure 1:
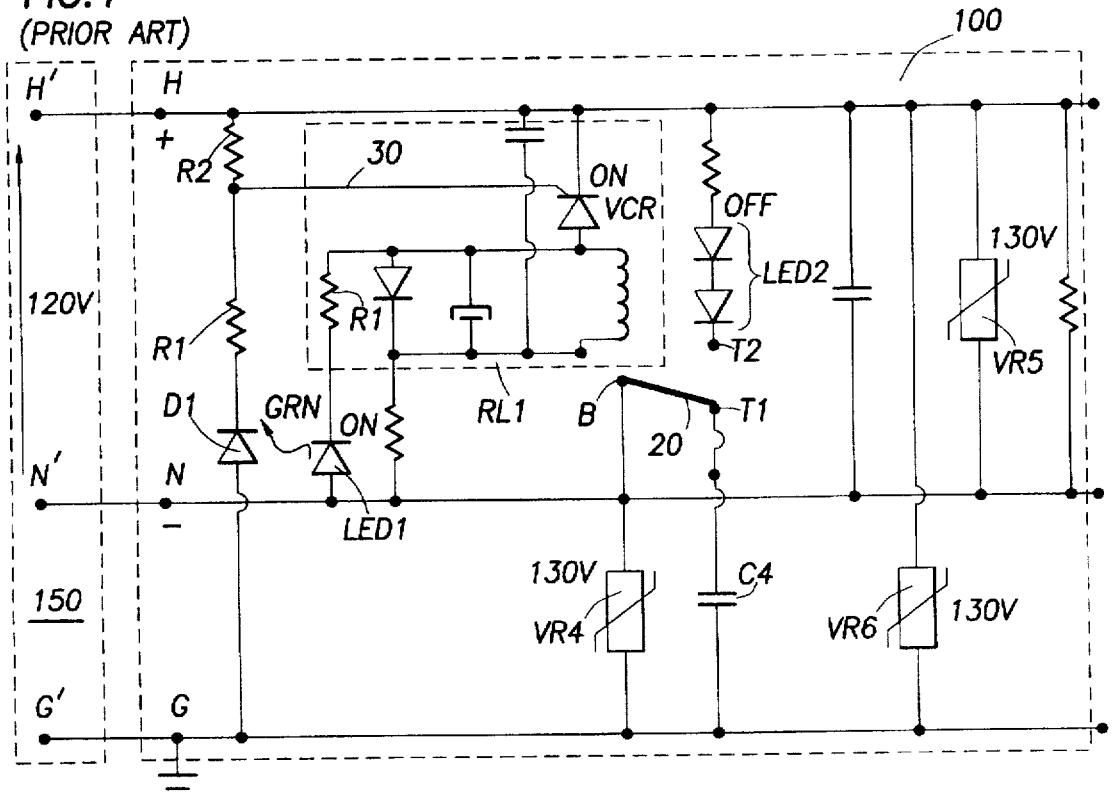
FIG. 1 is a schematic of a known prior art power filter circuit arrangement which illustrates its connection to properly connected hot and neutral utility leads and showing a relay switch arm in a normally open position of a safety circuit.
Figure 2:
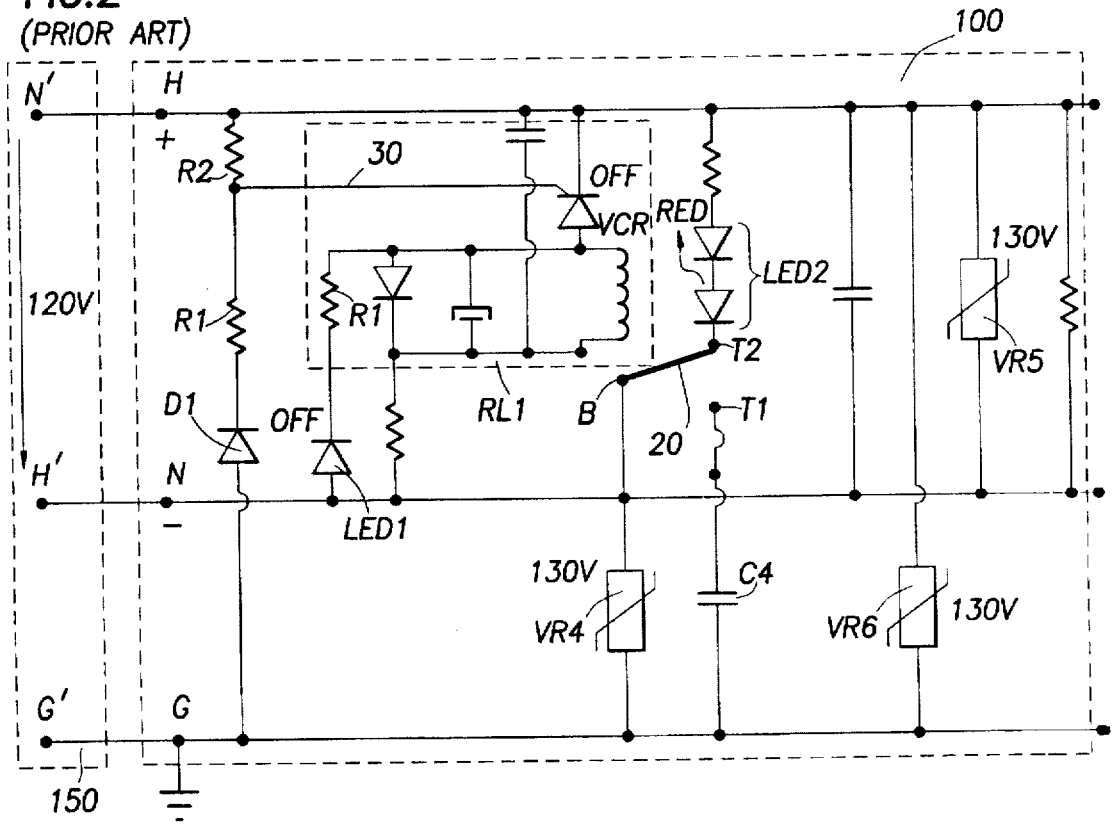
FIG. 2 is a schematic of the known prior art power filter circuit of FIG. 1 but where it has been connected to reversed hot and neutral leads from a utility plug and shows a relay switch arm in a closed position of a safety circuit for illuminating an indicator for informing a user that the hot and neutral leads are improperly reversed.

FIGS. 1 and 2 illustrate a known prior art power filter circuit. FIG. 1 shows such known circuit with its hot (H), neutral (N) and ground (G) leads properly connected to hot (H'), neutral (N') and ground (G') leads of a utility plug. A utility plug is a wall plug to which power utility leads are connected. Proper connection of a male plug from the power filter circuit 100 to a wall plug 150 is achieved by mechanical means, for example by requiring that the male plug elements of power filter circuit 100 uniquely fit within corresponding female receptacles of wall plug 150.

FIG. 1 shows the power filter circuit 100 properly mechanically connected with plug element H', N', and G', but the electric utility leads are improperly connected, e.g., the high utility lead is connected to the female neutral plug receptacle N', and the neutral utility lead is connected to the female high plug receptacle H'.

FIG. 1, showing normal operation of the prior art power filter circuit 100, includes a diode D1 and voltage divider resistors $R_1$ and $R_2$ connected between the hot H and neutral N leads of the circuit. When the hot lead carries utility voltage, e.g., 120 V RMS, the rectifier D1 carries a positive D.C. voltage to be produced by the voltage divider $R_1$, $R_2$ which is applied via lead 30 to voltage controlled rectifier VCR. When a positive voltage is applied to the VCR, current flows through relay circuit RL1 via green light emitting diode LED1 thereby causing switch arm 20 to be connected between base B and terminal T1. The green signal produced by LED1 indicates proper plug connection. In the prior art known connection base B is connected to neutral lead N by means of lead 22. A clamping device VR4 is connected between the neutral lead N and the ground lead G. A clamping device VR5 is connected across the hot lead H and the neutral lead N. A clamping device VR6 is also connected across the hot lead H and the ground lead G.

A capacitor C4 connected between ground G and terminal T1 provides filtration of noise signals between neutral lead N and ground G because switch arm 20 is connected between terminal T1 and neutral lead N. The size of capacitor C4 in the prior art power filter circuit 100 is 0.1 micro farads.

FIG. 2 shows the operation of the prior art power circuit where the utility hot and neutral leads are crossed such that the power filter circuit 100 has 120 volts applied from its hot lead H to it neutral lead N. Accordingly, no positive voltage appears between the resistors $R_1$, $R_2$, voltage control rectifier VCR does not turn on, and the relay circuit is not energized, thereby causing switch arm 20 to be connected between base terminal B and terminal $T_2$. As a result, current flows through light emitting diodes LED2 which flash a red signal indicating that the wall plug leads are improperly reversed in polarity. A user of the power filter now has information provided to him or her in order to take corrective action.

The clamping device VR4, as connected in the prior art power filter circuit is now across the neutral and ground lead N and G. Utility voltage 120 volts appears across such leads. Accordingly, the clamping device VR4 is required to be greater than nominal line voltage of 120 volts. A rating of 130 volts has been found to be satisfactory.

Figure 3:
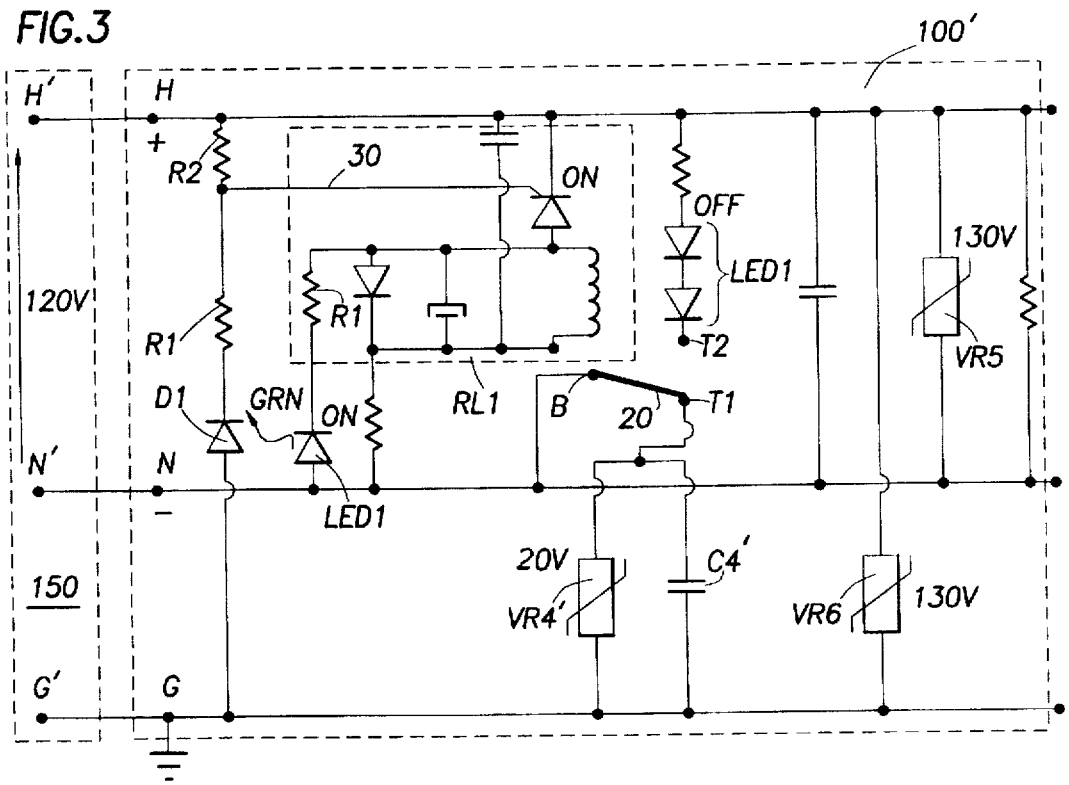
FIG. 3 is a schematic of the improved power filter circuit which embodies the invention where the clamping device between the neutral and ground leads is effective only when the relay arm is in a normally open position of the safety circuit, where such open position is indicative that the hot and neutral leads of the improved filter circuit are properly connected to the respective hot and neutral leads.
Figure 4:
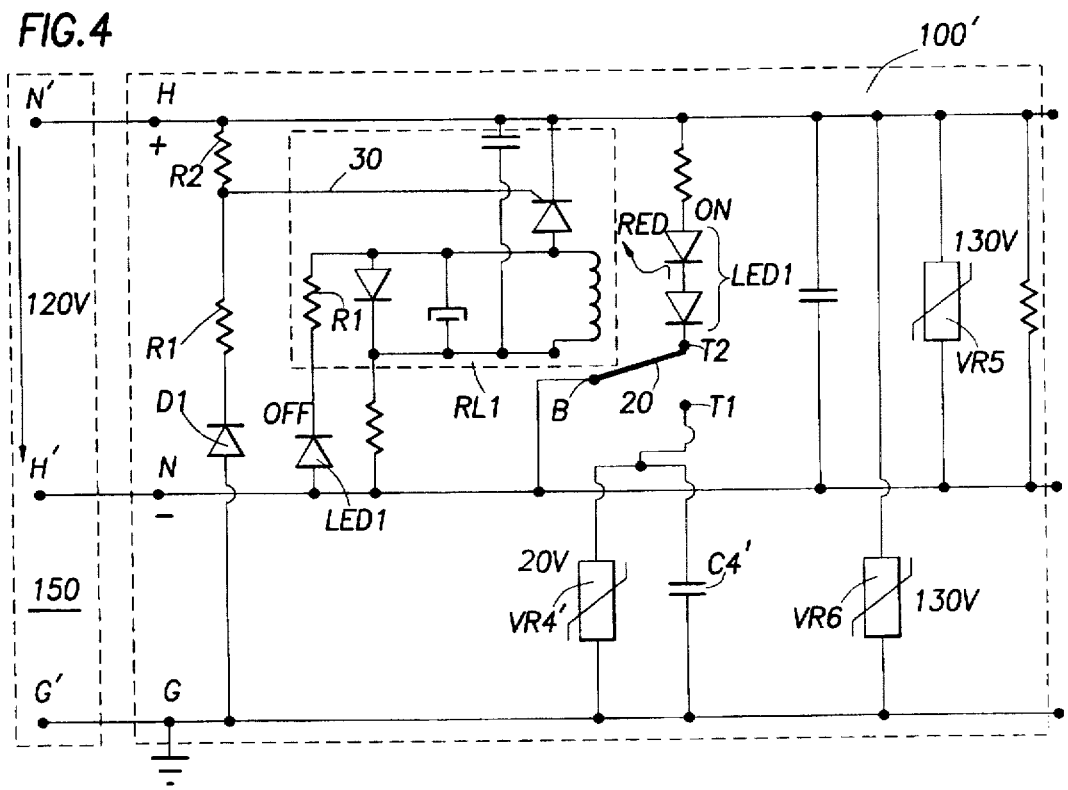
FIG. 4 is a schematic of the improved power filter circuit of the invention where the clamping device normally connected between the neutral and ground leads is not in the circuit when the improved power filter circuit is connected to improperly reversed hot and neutral leads of a utility plug.

FIGS. 3 and 4 illustrate the improved power filter circuit which embodies the invention. A different clamping device VR4' is substituted in the known prior an power filter circuit of FIGS. 1 and 2. Clamping device VR4' is connected between the ground lead G and the terminal $T_1$ in the improved circuit, not to the neutral lead N as in FIGS. 1 and 2. As a result, during normal operations where the hot lead H is properly connected to the utility hot lead Hi', switch arm 20 is connected between the base B and terminal $T_1$, and as a result, clamping device VR4' is connected between the ground lead G and the neutral lead N. It may be rated at a lower value, e.g., 20 volts so as to protect against surges or spikes between the ground and neutral leads.

The size of capacitor C4' of the improved power filter circuit 100 has been greatly increased over the size of capacitor C4 of the prior power filter circuit 100 of FIGS. 1 and 2. Capacitor C4' is of a size, preferably 2.2 micro farads which filters substantially all noise signals which appear across neutral N and ground lead G.

FIG. 4 illustrates the case when the hot H' and neutral N' leads of the utility plug are reversed. In that case, as explained by reference to FIG. 2 above, switch 20 changes to the position between base B and terminal $T_2$. But clamping circuit VR4' now is not across the neutral N lead and the ground lead G' thus there is no need for it to be rated at a high voltage value due to the fact the 120 volts now appears across the N and G leads.

Various modifications and alterations in the described methods of manufacture and apparatus will be apparent to those skilled in the an of the foregoing description which does not depart from the spirit of the invention. For this mason, such changes are desired to be included within the scope of the appended claims. The appended claims recite the only limitations to the present invention. The descriptive manner which is employed for setting forth the embodiments should be interpreted as illustrative but not limitative.

What is claimed is:

1. An improved protective circuit having hot, neutral and ground leads arranged to be placed between corresponding hot, neutral and ground leads of a power utility outlet and corresponding hot, neutral and ground leads of electrical apparatus, said protective circuit including a relay circuit connected between the hot and neutral leads of the protective circuit, said relay circuit arranged to control a relay switch arm which connects the neutral lead to a first terminal having an electrical path to ground when the power utility leads carry high A.C. voltage on said hot lead, and in which the relay arm connects the protective circuit hot lead to said protective circuit neutral lead via an electrical path when the power utility leads carry substantially zero voltage on the utility hot terminal and high A.C. voltage on said utility neutral terminal;

wherein the improvement is characterized by
a clamping device being connected between said ground lead and said first terminal,
whereby said clamping device is provided at a low rating characteristic of expected A.C. voltage differences between neutral and ground leads.

2. The improvement of claim 1 wherein said clamping device is rated at 20 volts.

3. The improvement of claim 1
wherein the improvement is further characterized by
a capacitor being connected between said ground lead and said first terminal of a large size, whereby substantially all noise signals on said neutral lead are filtered to ground when said hot, neutral and ground leads of said circuit are connected respectively to hot, neutral and ground leads of a power utility outlet.

4. The improvement of claim 3 wherein
said capacitor is of a value of about 2.2 micro farads.

* * * * *